K. MASILIUNAS.
CANDLESTICK.
APPLICATION FILED MAR. 25, 1918.
1,296,682. Patented Mar. 11, 1919.
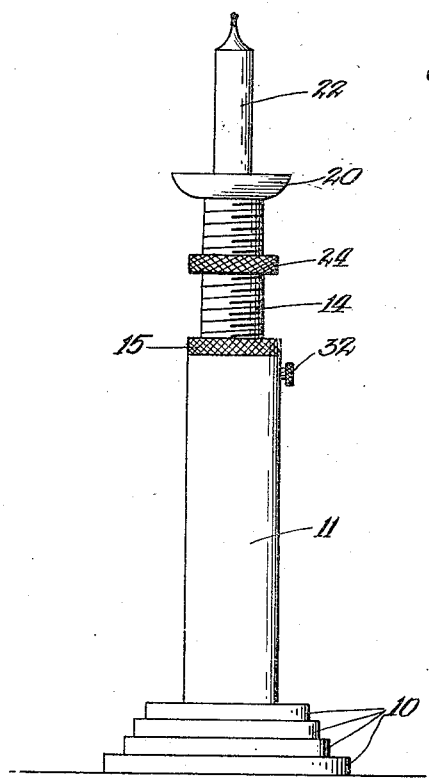
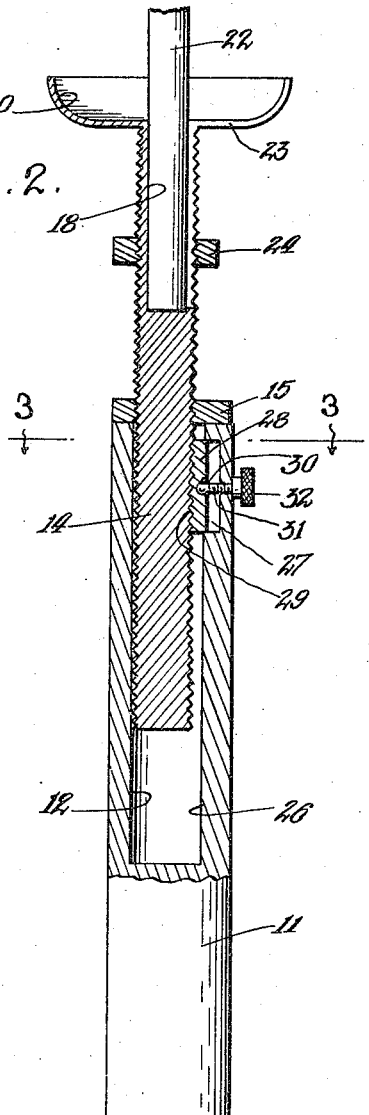
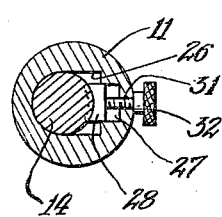
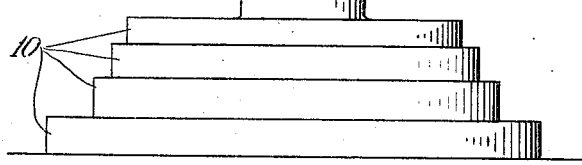
Inventor
Kazimiras Masiliunas
By Oscar Geier
Attorney

UNITED STATES PATENT OFFICE.

KAZIMIRAS MASILIUNAS, OF CHICAGO, ILLINOIS.

CANDLESTICK.

1,296,682.  Specification of Letters Patent.  Patented Mar. 11, 1919.

Application filed March 25, 1918. Serial No. 224,684.

*To all whom it may concern:*

Be it known that I, KAZIMIRAS MASILIUNAS, a citizen of Russia, residing at Chicago, county of Cook, and State of Illinois, have invented certain new and useful Improvements in Candlesticks, of which the following is a specification.

This invention relates to improvements in candle sticks and has as its special object the provision of means whereby the candle support may be raised or lowered relatively to its base.

A further object is to provide means whereby the adjustment of the candle is obtained in an easy and rapid manner.

These and other like objects are attained by the novel construction and combination of parts hereinafter described and shown in the accompanying drawing, forming a material part of this disclosure, and in which:—

Figure 1 is a side elevational view showing a candle-stick made in accordance with the invention.

Fig. 2 is a similar sectional view drawn to an enlarged scale, parts being shown in section in order to disclose the construction, and, Fig. 3 is a horizontal sectional view taken on line 3—3 of Fig. 2.

The invention comprises a base formed of a plurality of superimposed disks 10, from which rises a standard 11, the same containing an off-set, longitudinal recess 12, suited to receive the threaded stem 14, of the candle carrier, there being fitted to the stem a knurled adjusting nut 15, which obviously may be rapidly rotated so that adjustment may be readily attained. This threaded stem is also formed with a cylindrical bore 18, at its upper part immediately adjacent to the drip cup 20, the bore being suited to receive the candle 22, a slot 23, being formed through the cup 20, and extended downwardly into the shank in the screw to a point coincident with the lower end of the bore for the candle.

Also centered upon this stem is another knurled nut 24, preventing the slotted cup and shank from expanding.

A part of the longitudinal recess 12, in the support or standard 11, is formed rectangularly, as at 26, the same having a narrow recess 27, extending outward therefrom, adapted to receive a block 28, having screw threads 29, formed upon its inner surface, and adapted to engage with the threads upon the adjustable stem 14.

The block is moved into or out of engagement with the screw-threaded shank by means of a knob or ball 30, at the end of a screw 31, having an extending operating knob 32.

In operation, the candle having been placed with its lower end downward in the opening 18, the nut 24 may be adjusted so as to secure the candle in position and the other nut 15 raised to any desired height, thereupon the threaded stem may be inserted in to the recess 12, the screw 31, having been retracted, together with the block with which it is engaged, so as to allow the threaded stem 14 to slide vertically within the standard 11, and upon operating the screw 31, the block 28 is caused to engage with the thread, holding it securely at any desired height.

Having thus described my invention what I claim as new and desire to secure by Letters Patent, is:

In a candle-stick, the combination with a base composed of a plurality of superimposed disks, a standard arising therefrom, said standard having a cylindrical longitudinal recess extending therein provided with a rectangular formed part, a threaded and slotted stem slidable freely within said recess, a knurled nut for holding said stem in an adjusted position at the top of said standard, a slotted cup formed with said stem adapted to receive the drippings of a candle, and containing an opening in which said candle may be inserted, a block slidably engaged in an inner recess of said standard, said block being engageable with said screw threaded stem, a screw having a knob engageable with said block, and an extending head formed with said threaded screw by means of which said block may be moved to or from said threaded stem, and a knurled nut on said stem for keeping the cup from expanding, substantially as described.

In testimony whereof I have affixed my signature.

KAZIMIRAS MASILIUNAS.